Feb. 6, 1945.   P. ORR   2,368,868
TRANSMISSION CONTROL
Filed June 19, 1942   3 Sheets-Sheet 1

Inventor:
Palmer Orr
By Edward C. Fritzbaugh
Atty.

Feb. 6, 1945.   P. ORR   2,368,868
TRANSMISSION CONTROL
Filed June 19, 1942   3 Sheets-Sheet 2
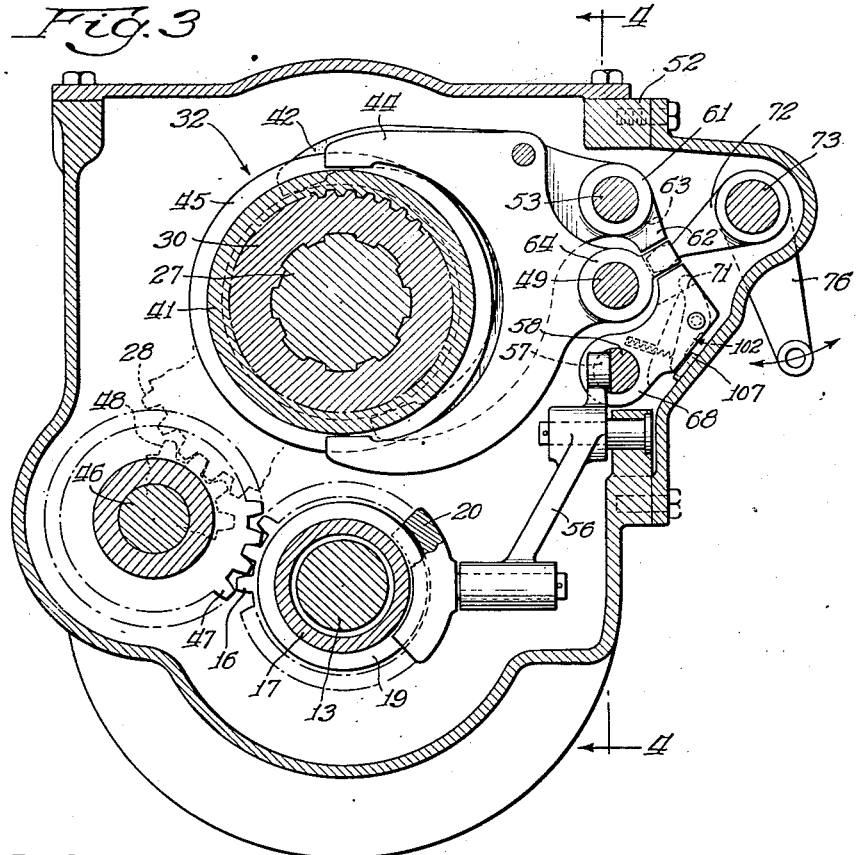
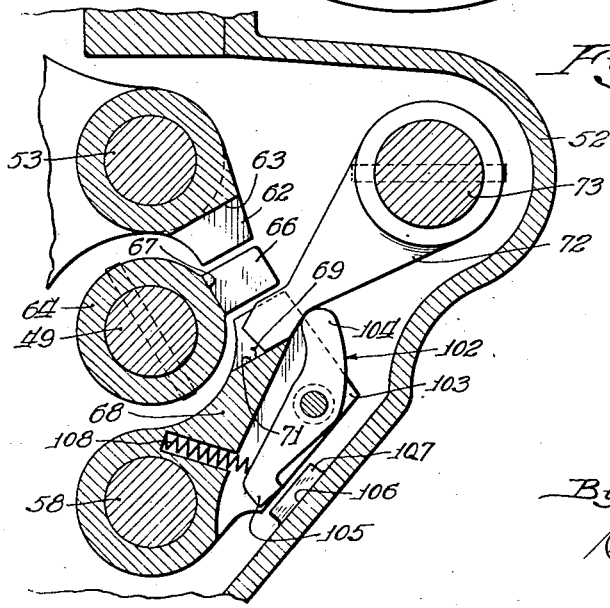
Inventor:
Palmer Orr
By Edward C. Fitzhugh
Atty.

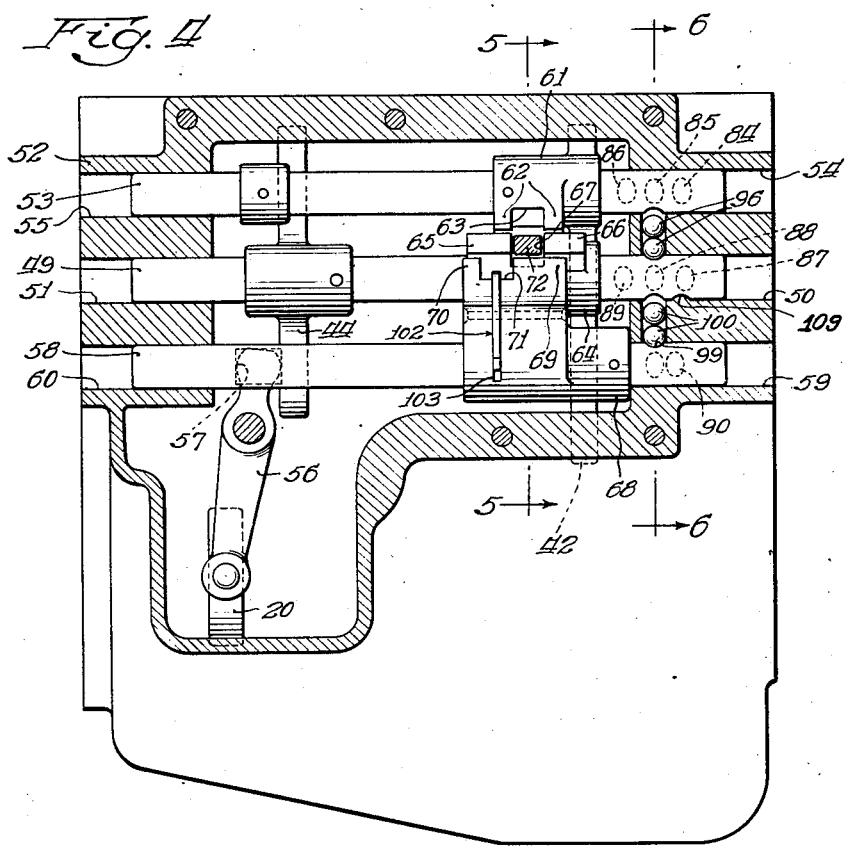

Patented Feb. 6, 1945

2,368,868

UNITED STATES PATENT OFFICE 2,368,868

TRANSMISSION CONTROL

Palmer Orr, Muncie, Ind., assignor to Borg-Warner Corporation, Chicago, Ill., a corporation of Illinois Application June 19, 1942, Serial No. 447,617

5 Claims. (Cl. 74—477)

This invention relates to change speed transmissions and particularly to a control mechanism therefor. It is particularly adaptable to multi-speed transmissions having a plurality of shiftable elements. For purposes of illustration it will be described with reference to a transmission which is disclosed in J. M. Simpson Patent No. 2,324,403, dated July 13, 1943. This invention is in the nature of an improvement over the control mechanism described in my Patent No. 2,328,227, dated Aug. 31, 1943.

In the prior application referred to, a control mechanism is disclosed wherein three shift rails and a cross rail are so interlocked that any rail not shifted cannot be accidentally jarred out of place. The interlocking means there disclosed comprises beans suitably disposed between the rails and housing.

The principal object of this invention is to provide in a multi-speed transmission having three or more shiftable devices, an interlock mechanism for the shift devices wherein the interlock mechanism is operated directly by the shift member itself.

A more specific object of this invention is to provide an interlock mechanism for a transmission employing three shift rails and a selector member wherein one of the rails is normally held against movement by a latch, said latch being releasable by the shift member.

These and other objects and features of this invention will become apparent from the following description when taken together with the accompanying drawings in which:

Fig. 3 is an end elevation in section of the transmission taken along a line corresponding to 3—3 of Fig. 1;

Fig. 4 is a side elevation in section of the controls for the transmission taken along line 4—4 of Fig. 3;

Fig. 5 is a fragmentary enlarged section through the controls taken along line 5—5 of Fig. 4; and Fig. 6 is a fragmentary section taken through the poppets for the control mechanism of Fig. 3, the section being taken along lines 6—6 of Fig. 4.

Figure 1:
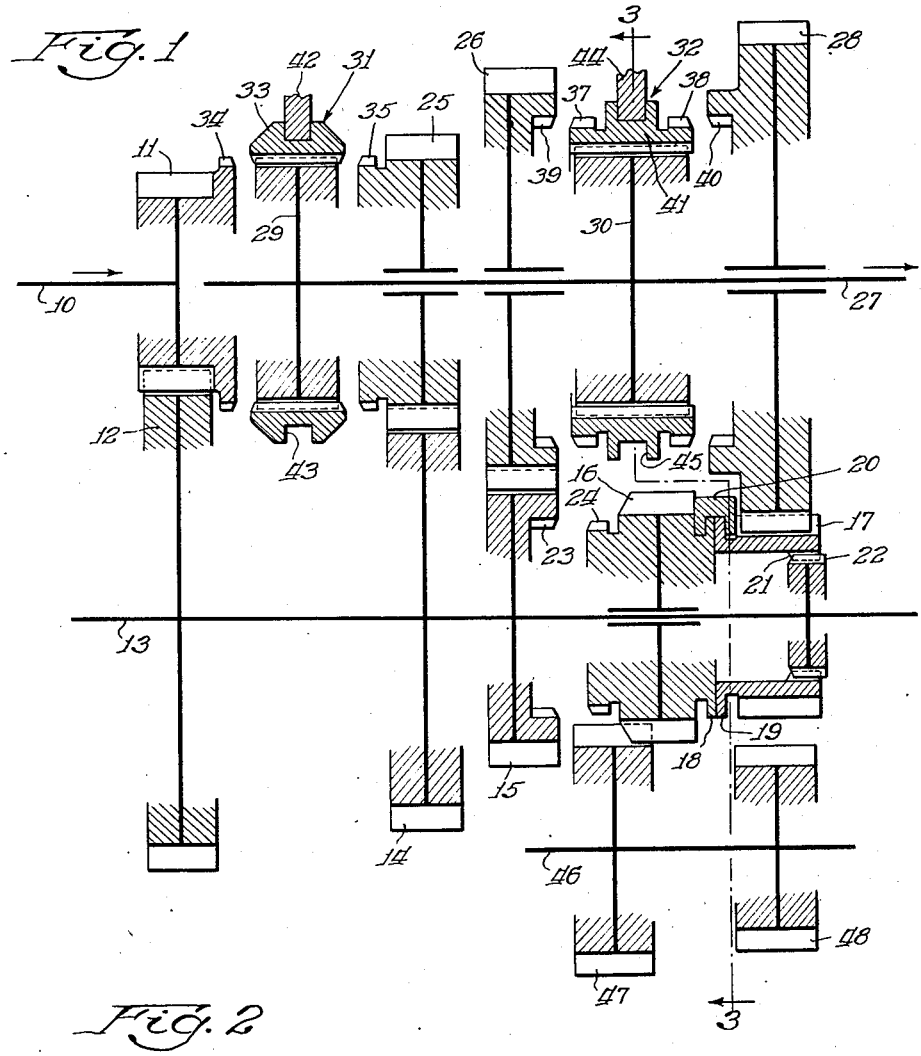
Fig. 1 is a schematic elevation of a four speed transmission in which the interlock of this invention may be used.

Referring now to Fig. 1 for a brief description of the transmission to which this invention is applied, power is impressed upon a drive shaft 10 from an engine or other source of power (not shown) to which is secured a drive gear 11. Said gear 11 is in constant mesh with a gear 12 mounted to drive a countershaft 13 on which are also drivably mounted gears 14 and 15. A fourth gear 16 is slidably mounted on countershaft 13 as is likewise a fifth gear 17. Said gears 16 and 17 are provided with flanges 18 and 19 respectively over which is fitted a U-shaped yoke 20 such that gears 16 and 17 must move together axially but may rotate independently of one another. Gear 17 is provided with internal splines 21 which, when said gear 17 is in the position shown, mesh with external splines 22 on countershaft 13. Gear 15 is provided on one side with internal clutch teeth 23 which are adapted to be engaged by external clutch teeth 24 on gear 16 when said gear 16 is moved to the left (Fig. 1).

In constant mesh with gears 14 and 15 are gears 25 and 26 respectively which are freely mounted on a driven shaft 27. A third gear 28 is likewise freely mounted on driven shaft 27. Drivably mounted on shaft 27 are hub members 29 and 30 of clutching devices 31 and 32 respectively, the function of each of which is selectively to connect gears 11, 25, 26 and 28 to driven shaft 27. To this end clutching device 31 is provided with an internally toothed collar 33 which may be moved to the left to engage clutch teeth 34 on gear 11 and to the right to engage clutch teeth 35 on gear 25. Similarly, clutch device 32 is provided with external teeth 37 and 38 which are engageable with internal teeth 39 and 40 respectively upon movement of internally toothed collar 41 to the left or right of the position shown. Each of said collars 33 and 41 is of course drivingly secured to its respective hub 29 and 30 so that when the collar is connected to its associated gear, said gear is in effect connected to drive driven shaft 27.

Movement of collar 33 is controlled by means of a shift fork 42 riding in a groove 43 in collar 33 and movement of collar 41 is effected by means of a shift fork 44 riding in a groove 45 in collar 41.

A second countershaft 46 is provided on which are mounted gears 47 and 48, the gears being so arranged as to rotate together. Gear 47 meshes with gear 16 and gear 48 meshes with gear 28 on shaft 27.

The ratios obtainable in the transmission just described are as follows:

Neutral is obtained by positioning collars 33 and 41 as shown in Fig. 1.

Low speed is obtained by sliding collar 41 to the right so that teeth 38 and 40 are in mesh. Gears 16 and 17 are likewise slid to the right so that the internal teeth 21 on gear 17 engage external teeth 22 on countershaft 13. The drive is then from drive shaft 10 and drive gear 11 to gear 12, countershaft 13, teeth 22 and 21, gear 17, gear 28 and clutch device 32 to driven shaft 27.

For the next higher speed, gears 16 and 17 remain as shown in Fig. 1, as does also clutch device 31, but collar 41 is slid to the left to engage teeth 37 with teeth 39. The drive is then from drive shaft 10 and drive gear 11 to gear 12, countershaft 13, gear 15, gear 26 and clutch device 32 to driven shaft 27.

For the third speed gears 16 and 17 again remain as shown in Fig. 1, clutch device 32 is moved to the position shown in Fig. 1, that is, with neither gear 26 nor gear 28 connected to driven shaft 27, and clutch device 31 is moved to the right so that collar 33 engages teeth 35 to clutch gear 25 to driven shaft 27. The gear train is then from drive shaft 10 and drive gear 11 to gear 12, countershaft 13, gear 14, and gear 25 to clutch device 31 and driven shaft 27.

For direct drive, clutch 32 remains in neutral and gears 16 and 17 again remain as shown in Fig. 1, but clutch device 31 is slid to the left so that teeth 34 engage collar 33 and connect gear 11 directly to driven shaft 27.

Reverse is obtained by conditioning clutch devices 31 and 32 and for the first speed drive but in addition sliding gears 16 and 17 to the left to engage teeth 24 with teeth 23. In engaging teeth 24 with teeth 23, gear 17 is disconnected from countershaft 13 and hence is free to rotate relative to the countershaft. The gear train is then from drive shaft 10 and drive gear 11 to gear 12, countershaft 13, gear 15, teeth 23 and 24 to gear 16 and thence to gear 47 on countershaft 46, gear 48, gear 28 and clutch device 32 to driven shaft 27. The incorporation of the idler gears 47 and 48 effects a reversal in the driving relation between shafts 10 and 27.

The details of the transmission just described are shown and claimed in the copending application of J. M. Simpson, Serial No. 436,819, filed March 30, 1942.

Figure 2:
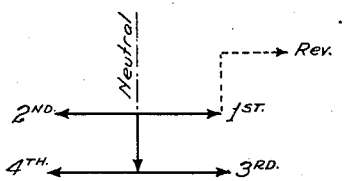
Fig. 2 is a diagram showing the movement of the shift element to obtain the various gear ratios and neutral.

The movement of the hand shift lever required to effect the various available ratios is shown in Fig. 2. It will be observed that direct and second are on one side of the neutral position and reverse, first and third are on the opposite side. Particular attention is directed to the fact that reverse is obtained by first shifting into the position for first speed, then shifting laterally and then shifting again in the same direction as the shift into first. The means by which movement of the shift lever in accordance with Fig. 2 is translated into the required movements of the shift devices of the transmission will now be described.

Referring now to the remaining figures, first and second speed shift fork 44 is shown secured to a shift rail 49 which is slidably retained in openings 50 and 51 in housing 52. Third and fourth (direct) speed shift fork 42 is connected for movement with a shift rail 53 which is slidably retained in openings 54 and 55 in housing 52. Reverse shift yoke 20 is pivotally mounted in one end of a lever 56, the other end of which is retained in a notch 57 in a shift rail 58 slidably mounted in openings 59 and 60 in housing 52. Lever 56 serves to reverse the direction of movement of shift yoke 20 with respect to shift rail 58.

Shift fork 42 is provided with an enlarged end 61 in which are formed a pair of spaced lugs 62 defining a notch 63. Shift rail 49 is provided with a cylindrical attachment 64 on which are formed spaced lugs 65 and 66 defining a notch 67 therebetween. Reverse shift rail 58 is similarly provided with a cylindrical attachment 68 on which are formed spaced lugs 69 and 70 forming therebetween a notch 71. Notches 63, 67 and 71 are of identical width axially of the rails. Said notches are adapted to be contacted by a lever 72 which is pinned to a cross rod 73 slidably retained in suitable openings (not shown) in housing 52. Said cross rod 73 is oscillatable about its axis by means of an external lever 76 which may be operated by a manual control (not shown) conveniently located near the operator.

The oscillation of cross rod 73 and its associated lever 72 effects a selection of the rails and axial movement of cross rod 73 by suitable means (not shown) effects a change in gear ratio by the axial movement of the shift rod selected.

Thus lever 72 may be moved axially to shift rails 49, 53 and 58 in either direction and may be oscillated about its own axis to engage any one of the notches 71, 67 and 63. As is customary in such devices the adjacent notches must be aligned before a cross over from one rail to another can be effected and the cross over is effected when the adjacent notches are in neutral position.

To assist the operator in determining when he has completed the shift to a particular ratio, poppets are used in conjunction with each rail. Thus (Fig. 6) shift rail 49 is provided with a poppet 78, shift rail 53 with a poppet 79 and shift rail 58 with a poppet 80. Each of the poppets is provided with a spring 81, 82 and 83 respectively, so as to resist movement of the rail out of a predetermined position. Shift rail 53 is provided with notches 84, 85 and 86 which cooperate with poppet 79 and correspond to third, neutral and direct positions respectively, shift rail 49 is provided with notches 87, 88 and 89 which cooperate with poppet 78 and correspond to first speed, neutral, and second speed, respectively, and shift rail 58 is provided with a notch 90 which cooperates with poppet 80 and corresponds to reverse position of rail 58. Movement in either direction from shift rail 49 is limited by the bottoms of notches 63 and 71, and after a rail has been shifted out of neutral position the lugs of the adjacent rails prevent lateral movement of shift lever 72.

Since no two ratios can be in operation simultaneously, an interlock is arranged between the rails such that when one rail is shifted out of neutral, the adjacent rail is locked in neutral position. This interlock comprises opposed notches (see Fig. 6) 94 and 95 on adjacent rails 49 and 53 and the usual plunger 96 riding in an opening 97 in housing 52 connecting notches 94 and 95. In the form chosen for illustration, plunger 96 comprises a pair of balls, but it might also be a single member such as the usual bean, or it may be a pair of members separated by a spring. In whatever form it may take, plunger 96 is of such length that when it is seated in one notch 95, for example, its opposite end is able to ride out of the opposite notch and on the outer surface of rail 49. Similarly, an interlock is provided between rails 49 and 58, these rails being provided with opposed notches 98, 99 with a plunger 100 riding in an opening 101 which is aligned with notches 98 and 99.

It will be observed however, that in view of the fact that no shift can be made until all rails are in neutral, when rail 53 is shifted out of neutral, the remaining rails 49 and 58 are in neutral and hence plunger 100 is ineffective to maintain rail 58 in neutral. If the transmission should be jarred, it is possible that rail 58 will be shifted out of neutral into reverse at the same time that rail 53 is in third speed or direct. This of course would be disastrous and an additional interlock therefore is provided to take care of such a contingency.

The additional interlock is shown in detail in Fig. 5. It is comprised of a pivoted latch 102 mounted in a slot 103 in cylindrical attachment 68 which is secured to reverse shift rail 58. Said latch 102 is provided with a toe portion 104 which normally extends into notch 71 in the path of movement of lever 72. The heel portion 105 under such conditions engages a slot 106 in housing 52, the slot being formed preferably by a pair of spaced lugs 107. A compression spring 108 continuously bears against heel portion 105 in a direction to maintain said heel in slot 106.

It is obvious that as long as heel 105 of latch 102 engaged slot 106, axial movement of shift rail 58 is impossible regardless of the condition of interlock 100. When, however, lever 72 is moved into notch 71 preparatory to shifting rail 58, lever 72 engages toe portion 104 of latch 102 and rotates the latch clockwise as viewed in Fig. 5 against the action of spring 108 to disengage heel portion 105 from slot 106. The disengagement is completed just prior to the completion of the shift of lever 72 into notch 71. With latch 102 freed from housing 52 and rail 58 is then readily movable axially to shift into reverse. Latch 102 will be maintained in a released condition so long as lever 72 is fully engaged in slot 71 and this engagement of lever 72 with slot 71 will obtain as long as lever 72 is in the position shown in Fig. 5.

No similar latch is required with respect to rail 53 since as pointed out above, rail 58 cannot be moved until the rail 49 is moved to the first speed position, and when rail 49 is so moved, interlock plunger 96 immediately becomes effective to prevent rail 53 from moving. A lock between rails 49 and 58 in the first speed position of rail 49 is prevented by an additional notch 109 in rail 49. Thus it will be apparent that with the combination of interlocks described above only one rail can be moved at a time and the operation of the one rail automatically prevents the remaining rails from moving.

It is understood that the foregoing description is merely illustrative of a preferred embodiment of the invention and that the scope of the invention therefore should not be determined thereby but should be determined instead by the appended claims.

I claim:

1. In a torque transmitting mechanism having a housing and a plurality of shiftable elements located therein, said elements comprising a first element for shifting into either one of two ratios, a second element for shifting into either one of two other ratios, and a third element for shifting into reverse, means for effecting a mutually exclusive operation of said elements comprising a shifter for engaging the elements, means for moving said shifter across said elements for selecting the elements, means for preventing engagement of said third element by said shifter until said second element has been shifted to provide one of said two other speed ratios, interlock means between said first and second elements, interlock means between said second and third elements, and a latch between said third element and said housing and releasable by said shifter when the shifter engages the third element.

2. In a torque transmitting mechanism having a housing and a plurality of shiftable elements located therein, said elements comprising a first element for shifting into either one of two ratios, a second element for shifting into either one of two other ratios, and a third element for shifting into reverse, means for effecting a mutually exclusive operation of said elements comprising a shifter for engaging said elements, means for moving the shifter across the elements to select one element, interlock means between the first and second elements effective to lock one of the elements when the other is shifted to provide one of said ratios, means for preventing engagement of the third element by the shifter until the second element has been shifted to provide one of said two other ratios, interlock means between the second and third elements for preventing movement of the second element after it has been shifted to provide one of said two other ratios and said third element has been shifted to provide reverse, and latch means between the third element and the housing, said latch means being releasable by the shifter when said shifter engages the third element.

3. In a torque transmitting mechanism having a housing and a plurality of shiftable elements therein, means for effecting a mutually exclusive operation of said elements comprising a shifter for engaging said elements, means for moving the shifter across the elements to select a single element, interlock means between adjacent elements and additional interlock means between one element and the housing, said one element having a slot therein for receiving the shifter element and another slot communicating with the first-mentioned slot, a pivoted latch in said second-mentioned slot having a toe portion extending into the shifter slot, and a heel portion, a slot in the housing engaged by the heel portion to prevent axial movement of said one element, and resilient means normally urging said latch toward the slot in the housing.

4. In a torque transmitting mechanism having a housing and a plurality of shiftable elements therein, one of said elements controlling the shift into reverse and at least two elements each controlling a pair of forward speeds, means for effecting a mutually exclusive operation of said elements comprising a shifter for engaging said elements, means for moving the shifter across the elements to select one element, interlock means between adjacent elements, and means for preventing an unwanted shift into reverse, said last-mentioned means comprising a slot in the housing, a latch in the reverse shifter element and means normally urging said latch into engagement with the slot, said slot being disposed transversely of the axis of movement of the reverse element.

5. A torque transmitting mechanism as described in claim 4, and means on the latch engageable by the shifter when the mechanism is to be shifted into reverse whereby to release the latch from its slot and permit movement of the reverse shifter element.

PALMER ORR.